United States Patent
Lee et al.

(10) Patent No.: US 11,868,454 B2
(45) Date of Patent: Jan. 9, 2024

(54) METHOD FOR PERFORMING BIOMETRIC AUTHENTICATION ACCORDING TO DISPLAY OF OBJECT RELATED TO BIOMETRIC AUTHENTICATION AND ELECTRONIC DEVICE THEREFOR

(71) Applicant: Samsung Electronics Co., Ltd., Suwon-si (KR)

(72) Inventors: Hee Jun Lee, Seoul (KR); Hyeong Wook Yang, Suwon-si (KR); Ju Woan Yoo, Anyang-si (KR); Kwang Hyun Lee, Yongin-si (KR); Won Suk Chang, Hwaseong-si (KR); Tushar Balasaheb Sandhan, Suwon-si (KR); Yang Soo Lee, Yongin-si (KR); Ji Yoon Park, Yongin-si (KR); Da Som Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 737 days.

(21) Appl. No.: 16/975,106

(22) PCT Filed: Sep. 13, 2018

(86) PCT No.: PCT/KR2018/010728
§ 371 (c)(1),
(2) Date: Aug. 21, 2020

(87) PCT Pub. No.: WO2019/164079
PCT Pub. Date: Aug. 29, 2019

(65) Prior Publication Data
US 2020/0401682 A1    Dec. 24, 2020

(30) Foreign Application Priority Data
Feb. 23, 2018 (KR) .......................... 10-2018-0022263

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/36* (2013.01); *G06V 10/19* (2022.01); *G06V 40/166* (2022.01); *G06V 40/67* (2022.01); *G06V 40/70* (2022.01)

(58) Field of Classification Search
CPC .......... G06F 21/32; G06F 21/36; G06F 3/048; G06F 21/45; G06V 40/166; G06V 40/19;
(Continued)

(56) References Cited

U.S. PATENT DOCUMENTS 10,204,266 B2   2/2019   Lee et al.
10,482,325 B2   11/2019  Jung et al.
(Continued)

FOREIGN PATENT DOCUMENTS

KR   10-2016-0036359 A   4/2016
KR   10-2016-0147515 A   12/2016
(Continued)

OTHER PUBLICATIONS

International Search Report dated Dec. 17, 2018 in connection with International Patent Application No. PCT/KR2018/010728, 2 pages.
(Continued)

*Primary Examiner* — Jeffrey C Pwu
*Assistant Examiner* — William A Corum, Jr.

(57) ABSTRACT

An electronic device is disclosed that includes a camera, a display, and a processor. The processor is configured to obtain a request associated with biometric authentication, obtain an image including at least one external object using the camera, display a specified image on the display, when displaying at least a portion of the obtained image on a
(Continued)

specified area of the display, the at least a portion of the obtained image being as a portion of the specified image, in response to displaying a specified object associated with the biometric authentication among the at least one external object on the specified area, perform the biometric authentication using biometric information corresponding to the specific object, and when displaying another image different from the obtained image on the display, the other image being as a portion of the specified image, in response to obtaining an image including the specified object among the at least one external object, perform the biometric authentication using the biometric information corresponding to the specified object. In addition, various embodiments recognized through the specification are possible.

15 Claims, 9 Drawing Sheets

(51) Int. Cl.
*G06F 21/36* (2013.01)
*G06V 10/10* (2022.01)
*G06V 40/60* (2022.01)
*G06V 40/70* (2022.01)
*G06V 40/16* (2022.01)

(58) Field of Classification Search
CPC ........ G06V 40/67; G06V 40/70; G06V 40/16; G06V 40/18; H04L 63/0861; H04L 9/3231
See application file for complete search history.

(56) References Cited

U.S. PATENT DOCUMENTS

| | | | |
|---|---|---|---|
| 2014/0056491 A1* | 2/2014 | Knight | G06V 40/16 |
| | | | 382/118 |
| 2016/0071111 A1* | 3/2016 | Wang | G06V 40/45 |
| | | | 705/44 |
| 2018/0008161 A1 | 1/2018 | Shin et al. | |
| 2018/0012070 A1 | 1/2018 | Shin et al. | |
| 2018/0032815 A1 | 2/2018 | Lee et al. | |
| 2019/0080189 A1* | 3/2019 | Van Os | H04N 23/611 |
| 2019/0171877 A1 | 6/2019 | Lee et al. | |
| 2019/0332877 A1* | 10/2019 | Nose | G06V 40/63 |

FOREIGN PATENT DOCUMENTS

| | | |
|---|---|---|
| KR | 10-2017-0004706 A | 1/2017 |
| KR | 10-2017-0087343 A | 7/2017 |
| KR | 10-1791463 B1 | 7/2017 |
| KR | 10-2018-0006087 A | 1/2018 |
| KR | 10-2018-0006133 A | 1/2018 |
| WO | 2017/208519 A1 | 12/2017 |

OTHER PUBLICATIONS

Supplementary European Search Report dated Sep. 11, 2020 in connection with European Patent Application No. 18 90 7245, 38 pages.

* cited by examiner

METHOD FOR PERFORMING BIOMETRIC AUTHENTICATION ACCORDING TO DISPLAY OF OBJECT RELATED TO BIOMETRIC AUTHENTICATION AND ELECTRONIC DEVICE THEREFOR

CROSS-REFERENCE TO RELATED APPLICATIONS

This application is a 371 of International Application No. PCT/KR2018/010728 filed on Sep. 13, 2018, which claims priority to Korean Patent Application No. 10-2018-0022263 filed on Feb. 23, 2018, the disclosures of which are herein incorporated by reference in their entirety.

BACKGROUND

1. Field

Embodiments disclosed in the disclosure relate to authentication technologies using biometric information.

2. Description of Related Art

As the importance of security has increased with an increase in digital means, various authentication methods such as biometric authentication have been used for security of user information. The biometric authentication is an authentication scheme of extracting and using biometric information, such as a fingerprint, an iris, a sweat gland structure, a face, or a blood vessel, which is specified for each person.

The biometric authentication is used for various purposes in an electronic device. A biometric authentication scheme is applied to various fields, for example, home screen unlock for use of the electronic device and user authentication upon execution of electronic commerce payment.

The electronic device may recognize an object associated with biometric authentication to obtain biometric information. For biometric authentication, recognizing an object which is a target of authentication may be performed earlier than the authentication. Unlike a conventional authentication scheme using a password, research has been actively conducted to suitably recognize an object because the biometric authentication may be affected by the outer environment (e.g., user motion or the like) while the object is obtained.

For biometric authentication, an object which is a target of authentication should be located in an authentication area of an electronic device. According to an existing technology, because of using a uniform authentication area irrespective of whether the electronic device provides a preview image on its display upon biometric authentication, there may be a problem in which the reliability of authentication or the efficiency of authentication is degraded.

Embodiments disclosed in the disclosure are to provide a method for recognizing an object based on a state upon biometric authentication and performing the biometric authentication in an electronic device.

SUMMARY

In accordance with an aspect of the disclosure, an electronic device is provided. The electronic device may include a camera, a display, and a processor. The processor is configured to obtain a request associated with biometric authentication, obtain an image including at least one external object using the camera, display a specified image on the display, when displaying at least a portion of the obtained image on a specified area of the display, the at least a portion of the obtained image being as a portion of the specified image, in response to displaying a specified object associated with the biometric authentication among the at least one external object on the specified area, perform the biometric authentication using biometric information corresponding to the specific object, and when displaying another image different from the obtained image on the display, the other image being as a portion of the specified image, in response to obtaining an image including the specified object among the at least one external object, perform the biometric authentication using the biometric information corresponding to the specified object.

In accordance with another aspect of the disclosure, a method is provided. The method may include obtaining a request associated with biometric authentication, obtaining an image including at least one external object using a camera, in response to the request, displaying a specified image on the display, when displaying at least a portion of the obtained image on a specified area of the display, the at least a portion of the obtained image being as a portion of the specified image, in response to displaying a specified object associated with the biometric authentication among the at least one external object on the specified area, perform the biometric authentication using biometric information corresponding to the specific object, and when displaying another image different from the obtained image on the display, the other image being as a portion of the specified image, in response to obtaining an image including the specified object among the at least one external object, perform the biometric authentication using the biometric information corresponding to the specified object.

In accordance with another aspect of the disclosure, an electronic device is provided. The electronic device may include a camera, a display, and a processor. The processor may be configured to receive a request associated with biometric authentication, obtain an image including at least one external object using the camera, based at least in part on the request, display a partial image corresponding to a specified location in the image on a specified area of the display, when a specified object associated with the biometric authentication among the at least one external object is displayed on the specified area of the display, perform authentication using biometric information corresponding to the specified object, and withhold performing the authentication, when the specified object is not displayed on the specified area of the display.

According to embodiments disclosed in the disclosure, the electronic device may efficiently perform biometric authentication.

According to embodiments disclosed in the disclosure, the electronic device may provide the result of performing the biometric authentication, which is reliable by the user.

In addition, various effects ascertained directly or indirectly through the present disclosure may be provided.

With regard to description of drawings, the same or similar denotations may be used for the same or similar components.

DETAILED DESCRIPTION

Hereinafter, various embodiments of the disclosure may be described with reference to the accompanying drawings. However, it should be understood that this is not intended to limit the disclosure to specific implementation forms and includes various modifications, equivalents, and/or alternatives of embodiments of the disclosure.

Figure 1:
FIG. 1 illustrates an operation environment of an electronic device according to an embodiment.

FIG. 1 illustrates an operation environment of an electronic device according to an embodiment.

According to an embodiment, the electronic device 100 may perform biometric authentication. An electronic device 100 may obtain a request associated with biometric authentication, may obtain an image including an external object in response to the request, may recognize or obtain a specified object associated with the biometric authentication among external objects, and may perform the biometric authentication using biometric information corresponding to the specified object.

The external object may include, for example, a user of the electronic device 100 (or a body part of the user) or various objects which surrounds the user. According to an embodiment, the specified object may be preset. For example, the specified object may be an iris and/or a face according to a user setting. While an authentication scheme of the electronic device is set to iris authentication, the specified object may be the iris.

Figure 2:
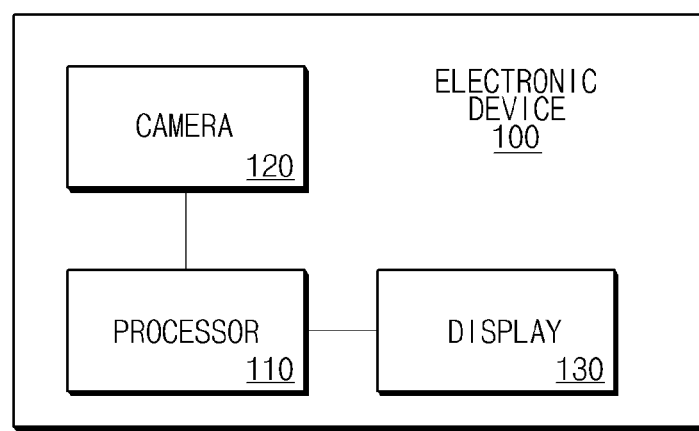
FIG. 2 is a configuration block diagram of an electronic device according to an embodiment.

FIG. 2 is a configuration block diagram of an electronic device according to an embodiment.

According to an embodiment, an electronic device 100 (e.g., an electronic device 100 of FIG. 1) may include at least one of a processor 110, a camera 120, or a display 130. In addition, various modifications according to various embodiments of the disclosure are possible in the configuration of the electronic device 100. For example, the electronic device 100 may further include a configuration such as a memory (not shown) (e.g., a memory 930 of FIG. 9) or a communication device (not shown) (e.g., a communication module 990 of FIG. 9).

According to an embodiment, the processor 110 may perform an operation according to various embodiments disclosed in the disclosure or may control an operation of another configuration. The processor 110 may provide a command to perform an operation of another configuration or may receive a command from the other configuration. For example, the processor 110 may obtain at least one image through the camera 120 and may process the obtained image. The processor 110 may obtain a specified object from the obtained image. The processor 110 may perform user authentication using the specified object. The user authentication may include biometric authentication. For example, the biometric authentication may be iris authentication or face authentication. According to an embodiment, the processor 110 may allow the camera 120 to capture an external object, may display the obtained image on the display 130, and/or may store information in the memory or may read the stored information.

According to an embodiment, the processor 110 may include at least one of an image signal processor, an application processor, or a camera driver device. An operation of the electronic device according to embodiments disclosed below may be executed by at least one processor.

According to an embodiment, the camera 120 may capture an external object outside the electronic device 100. The processor 110 may allow the camera 120 to capture the external object and may obtain an image associated with the external object. The camera 120 may be disposed on a front surface or a rear surface of the electronic device 100. The camera 120 may be exposed through a front housing or a rear housing of the electronic device 100.

According to an embodiment, the camera 120 may be a device configured to obtain an image using an infrared ray (IR). The camera 120 may include at least one of an IR image sensor or a band pass filter. The IR image sensor may sense the captured image and may convert the image into an electrical signal. The camera 120 may obtain an image corresponding to the biometric authentication based on the IR image sensor. The image may be a raw image, which have information about intensity of light detected by an imaging medium. The image may be an image having full resolution, which is sensed by the IR image sensor. In various embodiments, the camera 120 may be referred to as an IR camera, and the image captured by the camera 120 may be referred to an IR image (or an IR video).

According to an embodiment, the memory may store a variety of information disclosed in the disclosure. For example, the memory may store settings associated with authentication of the electronic device 100. For example, the electronic device 100 may be configured to perform iris authentication and/or face authentication, in response to a request associated with authentication.

According to an embodiment, the memory may store an image obtained through the camera 120. The image may be stored in the formed of an image file or a video file. The memory may store information associated with authentication. For example, the memory may previously store biometric information by datatizing and/or encrypting biometric information associated with a user of the electronic device 100. The stored biometric information may be referred to as biometric data for performing user authentication. The memory may store biometric feature information authenticated for biometric recognition. The biometric data or the biometric feature information may be stored in a secure area of the memory. The memory may be a memory included in a secure element. The secure element may include, for example, a secure digital (SD) card.

According to an embodiment, the memory may store instructions instructing to perform various operations disclosed in the disclosure. The processor 110 may execute the instructions.

According to an embodiment, the display 130 may display a variety of information (e.g., multimedia data, text data, or the like) to a user. The display 130 may display a screen according to control of the processor 110. The display 130 may be a touchscreen display for obtaining an input of the user. According to an embodiment, the processor 110 may display a screen including a preview image on the display 130 or may display another screen including a non-preview image on the display 130. The other screen may be, for example, a graphic screen.

Figure 3:
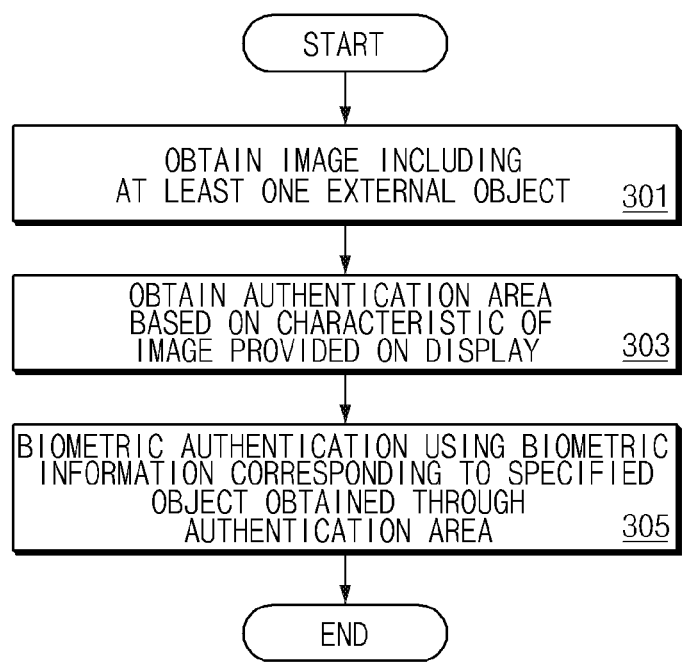
FIG. 3 is an operational flowchart for obtaining biometric information in an electronic device according to an embodiment.

FIG. 3 is an operational flowchart for obtaining biometric information in an electronic device according to an embodiment.

Referring to FIG. 3, an electronic device 100 may obtain an authentication area for obtaining biometric information based on a characteristic of an image displayed on a display 130. The electronic device 100 may detect a specified object associated with biometric authentication from the authentication area and may extract biometric information. An operation of the electronic device 100, which will be described below, may be performed by a processor 110 of the electronic device 100. Operations below may be stored in a memory of the electronic device 100 in the form of instructions.

In operation 301, the electronic device 100 may obtain an image including at least one external object. The electronic device 100 may obtain the image including the at least one external object through the camera 120. The external object may be an object located outside the electronic device 100. The image may be referred to as an IR image.

In operation 303, the electronic device 100 may obtain an authentication area based on a characteristic of an image provided on the display 130. According to an embodiment, the electronic device 100 may obtain a first area as an authentication area when the image provided on the display 130 is an image of a first characteristic and may obtain a second area as the authentication area when the image provided on the display 130 is an image of a second characteristic. According to an embodiment, the image of the first characteristic may be an image including at least a portion of the image obtained in operation 301. The image of the second characteristic may be an image which does not include the image obtained in operation 301. For example, the image of the second characteristic may be an image displayed on the display 130 before the image is obtained. The authentication area may be a specific area of the image obtained in operation 301.

According to an embodiment, the image displayed on the display 130 by the electronic device 100 may be determined based on an operation or function executed by the electronic device 100. For example, the image may be determined based on an application run by the electronic device 100.

In operation 305, the electronic device 100 may perform biometric authentication using biometric information corresponding to a specified object obtained through the authentication area. The electronic device 100 may search for the specified object in the authentication area of the obtained image. The authentication area may be the authentication area determined in operation 303. The specified object may be associated with biometric authentication. For example, the biometric information may be an iris or a face. The specified object may be preset in the electronic device 100. When a user sets iris authentication, the specified object may be an iris.

The electronic device 100 may extract the biometric information and may perform biometric authentication using the biometric information. The electronic device 100 may compare the biometric information with previously stored biometric data. When the specified object is identical to the biometric data as a result of the comparison, the electronic device 100 may perform a specified operation in response to the biometric data. The electronic device 100 may determine whether the biometric information is identical to the biometric data over a specified level. For example, the electronic device 100 may perform an operation of unlocking a home screen or unlocking an application.

Figure 4:
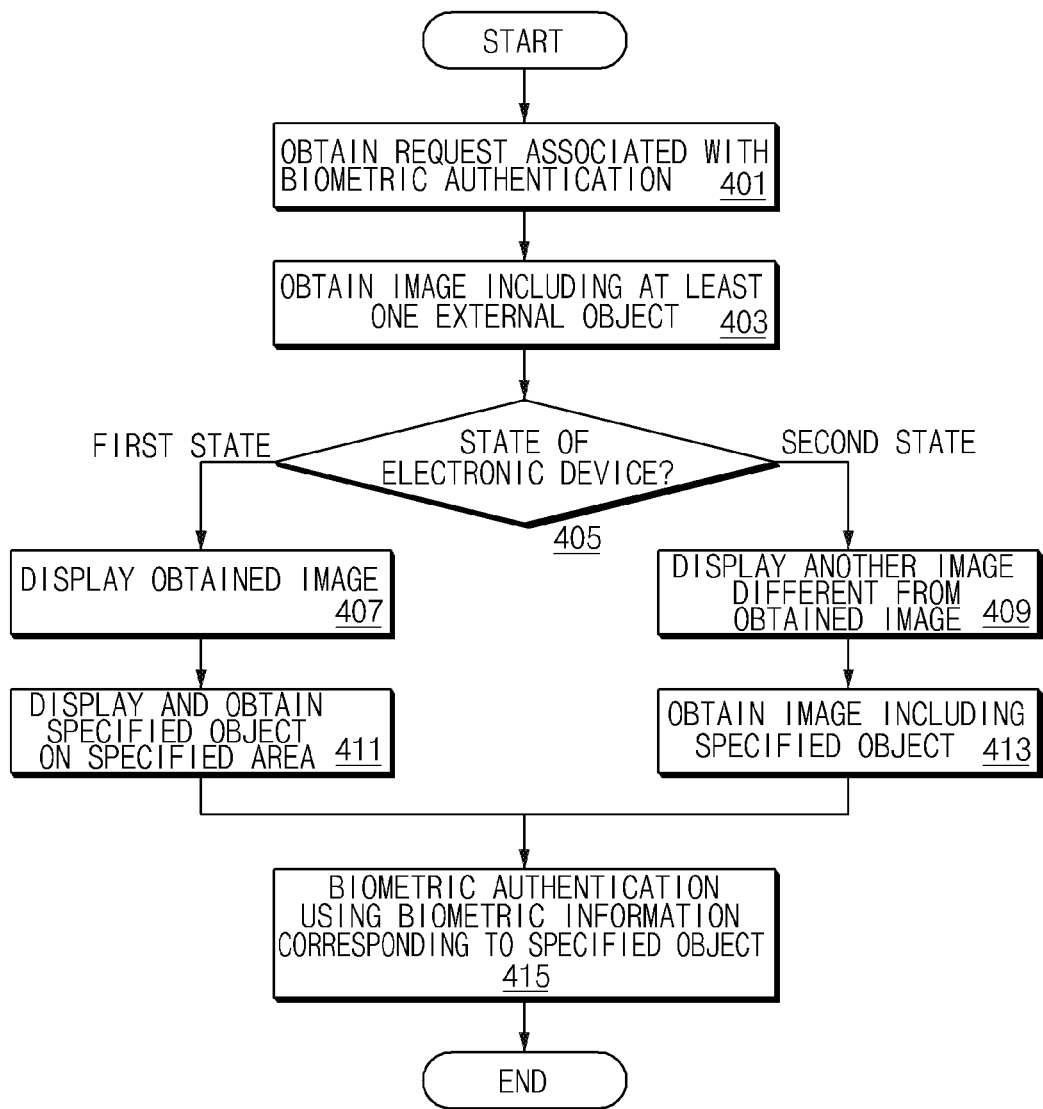
FIG. 4 is an operational flowchart for performing biometric authentication in an electronic device according to an embodiment.

FIG. 4 is an operational flowchart for performing biometric authentication depending on an image feature in an electronic device according to an embodiment.

Referring to FIG. 4, according to an embodiment, a specified image provided on the display 130 upon biometric authentication may be determined based on a state of an electronic device 100. Furthermore, an electronic device (e.g., the electronic device 100 of FIG. 1) may determine an authentication area based on whether an image provided on the display 130 includes a preview image. An operation of the electronic device 100, which will be described below, may be performed by a processor 110 of the electronic device 100. Operations below may be stored in a memory of the electronic device 100 in the form of instructions.

In operation 401, the electronic device 100 may obtain a request associated with biometric authentication. The request associated with the biometric authentication may correspond to a selection of a user, a request associated with authentication from an external device, or an operation associated with authentication of the electronic device 100 or may be generated in response to the corresponding operation.

In operation 403, the electronic device 100 may obtain an image including at least one external object. The electronic device 100 may obtain the image including the at least one external object using the camera 120, in response to the request associated with the biometric authentication. While obtaining the image including the at least one external object, the electronic device 100 may display a screen including a graphic image or a preview image on the display 130. For example, in response to an input where the user turns on a home screen or an operation where the electronic device 100 turns on the home screen, the electronic device 100 may control such that the camera 120 captures the image.

In operation 405, the electronic device 100 may identify a state of the corresponding electronic device 100. The electronic device 100 may identify an operation or function the electronic device 100 is executing.

The first device 100 may perform operation 407 when in a first state (e.g., when an application associated with payment is run) and may perform operation 409 when in a second state (e.g., when the home screen is run).

According to an embodiment, in operation 407 or 409, the electronic device 100 may display a specified image. According to an embodiment, as the electronic device 100 responds to the request associated with the biometric authentication depending on a state of the electronic device 100, the specified image displayed on the display 130 may vary.

In operation 407, the electronic device 100 may display a screen including at least a portion of the obtained image on the display 130. The electronic device 100 may provide at least a portion of the obtained image on a specified area of the display 130. In other words, the electronic device may provide a preview image.

In operation 409, the electronic device 100 may display another image different from the obtained image on the display 130. The other image may be a non-preview image. The other image may be, for example, a graphic image displayed on the display 130 before the electronic device 100 obtains the image (or before the electronic device 100 obtains the request associated with the biometric authentication).

The other image may fail to include an external object obtained while an authentication procedure is performed. Operations 403 and 405 may be performed at the same or similar time.

According to an embodiment, while providing at least a portion of the image obtained in operation 407 on the display 130, in operation 411, the electronic device 100 may obtain a specified object in response to an operation of displaying the specified object.

According to an embodiment, while providing the other image on the display 130 in operation 409, in operation 413, the electronic device 100 may obtain the specified object in response to an operation of obtaining an image including the specified object.

According to an embodiment, while providing at least a portion of the obtained image on the display 130, the electronic device 100 may set a first area to an authentication area. According to an embodiment, the first area may correspond to a specified area where the preview image is provided on the display 130. An image in the first area may be displayed on the specified area. According to an embodiment, while providing the other image on the display 130, the electronic device 100 may set a second area to the authentication area. The second area may be an area wider than the first area (or the specified area). The second area may be, for example, an area capable of being obtained through the camera 120. In other words, the entire area of the image obtained by the camera 120 may be the authentication area.

According to an embodiment, while displaying the specified image, the electronic device 100 may search for a specified object in the authentication area. For example, while displaying at least a portion of the obtained image, the electronic device 100 may search for the specified object in the authentication area. While displaying the other image, the electronic device 100 may search for the specified object in the authentication area.

According to an embodiment, the electronic device 100 may search for the specified object in the following manner. According to an embodiment, when the specified object is an iris, the electronic device 100 may first detect locations of eyes. The electronic device 100 may detect a face before detecting the locations of the eyes and may detect the eyes from the detected face. After detecting the eyes, the electronic device 100 may attempt to perform iris recognition. When detecting the eyes and/or the face, the electronic device 100 may detect the eyes and/or the face from the entire image. When attempting to perform the iris detection, the electronic device 100 may attempt to perform the iris recognition in the authentication area.

In operation 415, the electronic device 100 may perform biometric authentication using biometric information corresponding to the specified object. The electronic device may recognize the specified object in the authentication area. The specified object may be, for example, an object, such as an iris or an eye, associated with biometric authentication. The electronic device 100 may obtain or extract the biometric information from the specified object and may perform biometric authentication using the biometric information. The operation described in operation 415 may be the same as or similar to operation 305 of FIG. 3.

In operations 407 and 409, when setting the authentication area depending on the preview image or the non-preview image, reliability for the result of performing the biometric authentication may be provided to the user. For example, while the preview image is provided, when biometric authentication is completed although biometric information of the user is located except for the specified area, there may be a question of the accuracy of authentication in view of the user. When the specified area is set to the authentication area, because it is able to complete biometric authentication only when the specified object is displayed on the specified area, the user may more trust the authentication result. Meanwhile, when biometric authentication proceeds in only a limited area while the non-preview image is provided, there may be inconvenience of having to place the specified object on the limited area although a preview image is not provided in view of the user. According to various embodiments disclosed in the disclosure, when the authentication area is set wide while a graphic image is provided, biometric authentication may proceed quickly.

Figure 5:
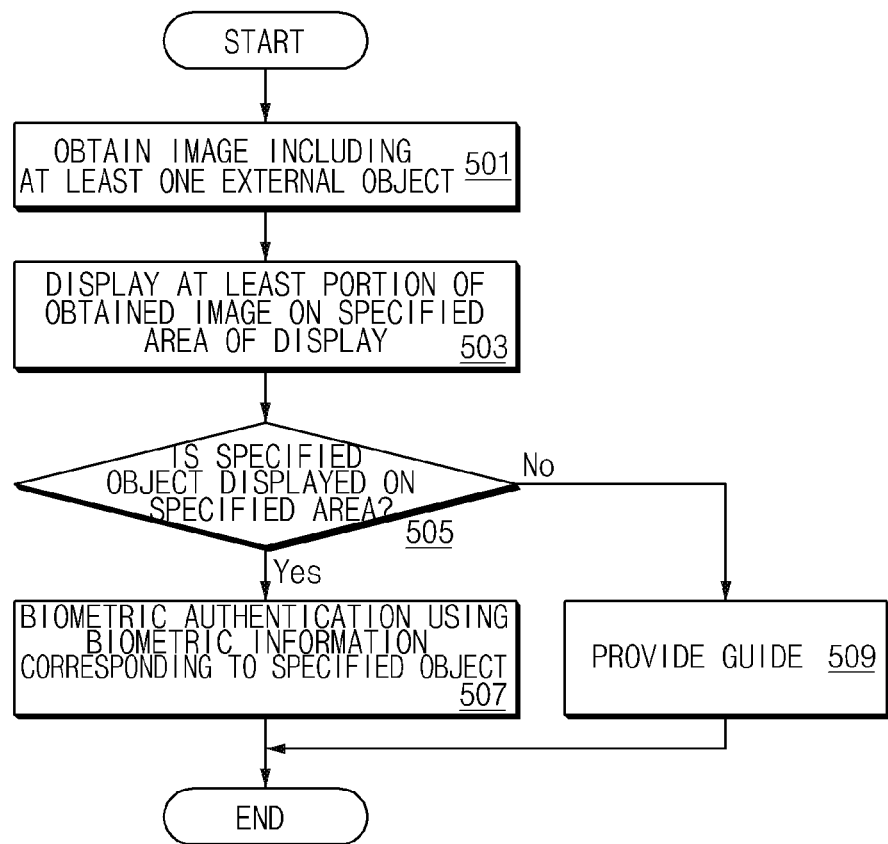
FIG. 5 is an operational flowchart of an electronic device while providing a preview image according to an embodiment.

FIG. 5 is an operational flowchart of an electronic device while providing a preview image according to an embodiment.

Referring to FIG. 5, while providing a preview image, an electronic device 100 may perform biometric authentication only when a first are includes a specified object. An operation of the electronic device 100, which will be described below, may be performed by a processor 110 of the electronic device 100. Operations below may be stored in a memory of the electronic device 100 in the form of instructions.

In operation 501, the electronic device 100 may obtain an image including at least one external object. The electronic device 100 may obtain the image including the at least one external object using the camera 120, in response to a request associated with biometric authentication.

In operation 503, the electronic device 100 may display the obtained image on a specified area of a display 130. The specified area may be a partial area of the display 130.

In operation 505, the electronic device 100 may identify whether a first area includes a specified object. The electronic device 100 may search for the specified object in the first area. The specified object may be associated with biometric authentication. The first area may correspond to a specified area of the display 130. In other words, a part included in the first area among the at least one external object may be displayed on the specified area of the display 130. The electronic device 100 may perform operation 507 when the first area includes the specified object and may perform operation 509 when the first area does not include the specified object. In another expression, the electronic device 100 may perform operation 507 in response to an operation of displaying an object specified in the first area (or a specified area) on the specified area.

In operation 507, the electronic device 100 may perform biometric authentication using biometric information corresponding to the specified object. The electronic device 100 may extract the biometric information and may perform biometric authentication using the biometric information.

In operation 509, the electronic device 100 may provide a guide. The electronic device 100 may display a guide associated with the first area (or the specified area) on the display 130. For example, the guide may include information guiding the specified object to the first region (or the specified area). The electronic device 100 may provide the guide and may perform operation 501 again.

Various modifications according to an embodiment disclosed in the disclosure are possible in various operations disclosed in the disclosure. For example, the electronic device 100 may fail to provide the guide in operation 509 and may fail to perform biometric authentication.

Figure 6:
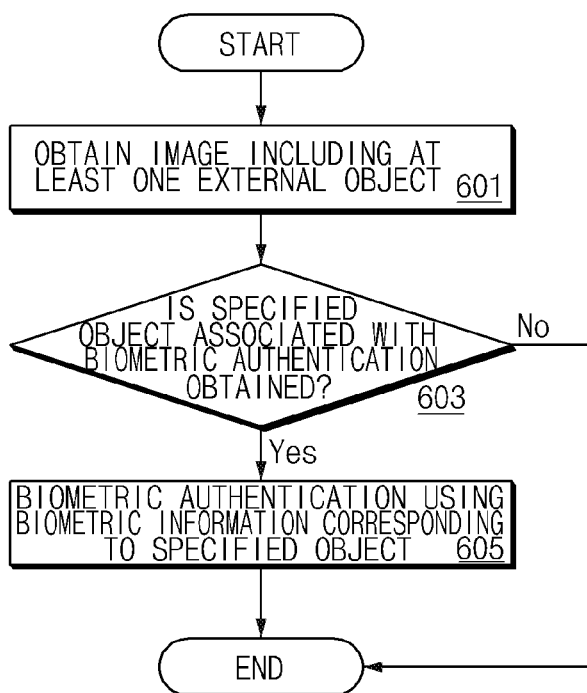
FIG. 6 is an operational flowchart of an electronic device while providing a non-preview image according to an embodiment.

FIG. 6 is an operational flowchart of an electronic device while providing a non-preview image according to an embodiment.

Referring to FIG. 6, when recognizing a specified object in a second area while providing a non-preview image, an electronic device 100 may perform biometric authentication. The electronic device 100 may obtain the specified object in an area except for a first area (or a specified area) of an obtained image. An operation of the electronic device 100, which will be described below, may be performed by a processor 110 of the electronic device 100. Operations below may be stored in a memory of the electronic device 100 in the form of instructions.

In operation 601, the electronic device 100 may obtain an image including at least one external object. Operation 601 may be the same as or similar to operation 501 of FIG. 5.

In operation 603, the electronic device 100 may identify whether the specified object is included. The electronic device 100 may identify whether the second area includes the specified object. The electronic device 100 may search for the specified object in the obtained image. The second area may be an area wider than the first area. The electronic device 100 may perform biometric authentication in response to recognition of the specified object. When the second area includes the specified object or when obtaining the specified object, the electronic device 100 may perform operation 605. When the second area does not include the specified object or when not obtaining the specified object, the electronic device 100 may fail to perform biometric authentication. The electronic device 100 may perform operation 601 again and may reattempt to recognize the specified object.

In operation 605, the electronic device 100 may perform biometric authentication using biometric information corresponding to the specified object. Operation 605 may be the same as or similar to operation 507 of FIG. 5.

Figure 7:
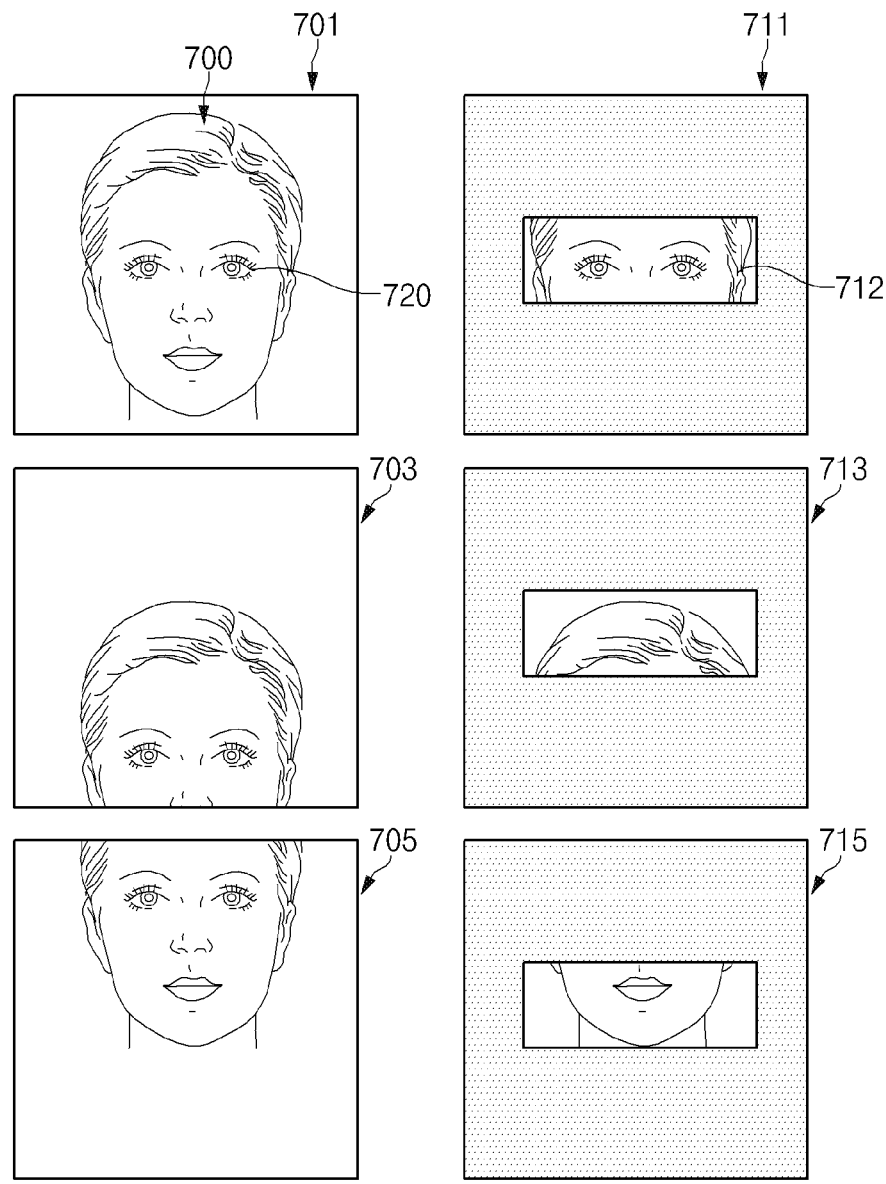
FIG. 7 is a drawing illustrating an authentication area of an electronic device according to an embodiment.

FIG. 7 is a drawing illustrating an authentication area of an electronic device according to an embodiment.

Image 701, image 703, or image 705 of FIG. 7 indicates an IR image including at least one external object obtained using a camera 120. Image 711, image 713, or image 715 may indicate a preview image including at least a portion of the external object 700 obtained using the camera 120, which is displayed on a specified area 712 of a display 130.

Image 703 is exemplified as an image obtained when the external object 700 is located at a lower end of an electronic device 100, relatively, than image 701. Image 705 is exemplified as an image obtained when the external object 701 is located at an upper end of the electronic device 100, relatively, than image 701.

The electronic device 100 may display a portion of the obtained image 701, image 703, or image 705 on the specified area 712 of the display 130. The specified area 712 may correspond to a first area for recognizing the specified object at the electronic device 100 while image 711, image 713, or image 715 is provided on the display 130.

When the electronic device 100 is set to perform iris recognition, the specified object 720 may be an iris. While a preview image is provided, the electronic device 100 may recognize the specified object 720, may obtain biometric information corresponding to the specified object 720, and may perform biometric authentication, while the specified object 720 is displayed in the specified area 712. Referring to FIG. 7, when image 701 is obtained, the electronic device 100 may perform biometric authentication.

When the preview image is provided, the electronic device 100 may fail in recognizing the specified object 720 in the first area, when the specified object 720 is not displayed on the specified area 712. As a result, biometric authentication may fail to be performed. Referring to FIG. 7, when image 703 and image 705 are obtained, biometric authentication may fail to be performed.

While the preview image is not provided, the electronic device 100 may search for the specified object 720 in an IR image. Referring to FIG. 7, when all of images 701 to 705, the electronic device 100 may recognize the specified object 720. The electronic device 100 may obtain biometric information from the specified object 720 and may perform biometric authentication. While the preview image is not provided, a graphic image, such as screen 801 of FIG. 8, may be provided on the display 130 of the electronic device 100.

Figure 8:
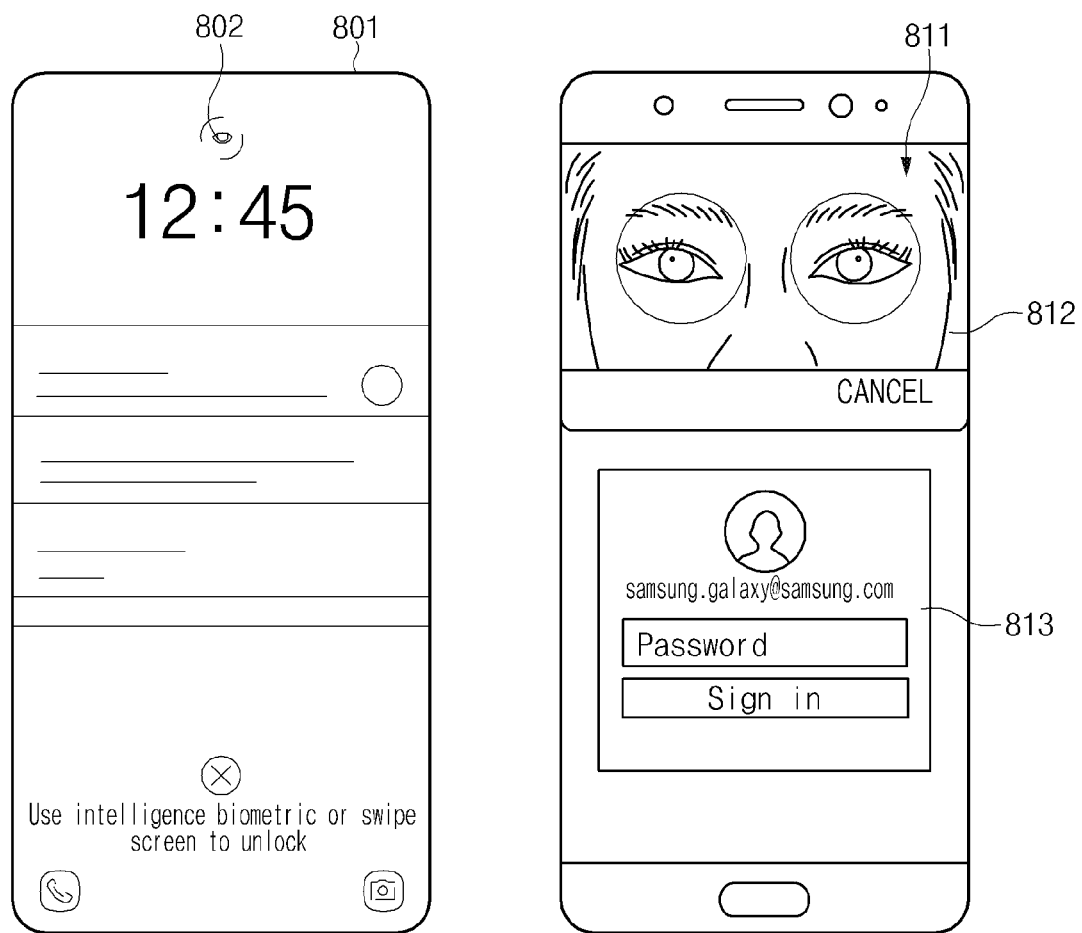
FIG. 8 illustrates a screen displayed on a display by an electronic device according to an embodiment.

FIG. 8 illustrates a screen displayed on a display by an electronic device according to an embodiment.

Referring to FIG. 8, while displaying a first screen 801 including a non-preview image, an electronic device 100 may attempt to perform biometric authentication. While the first screen 801 is displayed, a second area of an obtained IR image (e.g., images 701, 703, and 705 of FIG. 7) may be an authentication area. The second area may include at least a portion of the other area except for a first area and a partial area.

According to an embodiment, the first screen 801 may include an icon 802 indicating state information associated with biometric authentication. While a preview image is not provided, the electronic device 100 may display the icon 802 on a display 130 such that a user may know while biometric authentication is being performed. The icon 802 may be associated with whether biometric authentication is being performed. For example, while iris recognition is being performed, the icon 802 associated with iris authentication may be included in the first screen 801.

According to an embodiment, while displaying a preview image on the display 130, the electronic device 101 may attempt to perform biometric authentication. A second screen 811 is exemplified as a screen including a preview image provided on the display 130 by the electronic device 100. The electronic device 100 may display an obtained image on a specified area 812. In response to an operation of displaying a specified object on the specified area 812, the electronic device 100 may perform biometric recognition. While the specified object is displayed on the specified area 812, it may be included in the first area. A graphic image may be displayed on the other area 813 where the specified area 812 is excluded from the second screen 811.

According to an embodiment, an electronic device may include a camera, a display, and a processor. The processor is configured to obtain a request associated with biometric authentication, obtain an image including at least one external object using the camera, in response to the request, display a specified image on the display, when displaying at least a portion of the obtained image on a specified area of the display, the at least a portion of the obtained image being as a portion of the specified image, in response to displaying a specified object associated with the biometric authentication among the at least one external object on the specified area, perform the biometric authentication using biometric information corresponding to the specific object, and when displaying another image different from the obtained image on the display, the other image being as a portion of the specified image, in response to obtaining an image including the specified object among the at least one external object, perform the biometric authentication using the biometric information corresponding to the specified object.

According to an embodiment, the processor may be configured to display the at least a portion of the obtained image on the specified area and withhold the biometric authentication when the at least a portion of the image does not include the specified object.

According to an embodiment, the processor may be configured to recognize the specified object in the at least a portion of the obtained image.

According to an embodiment, the specified object may include at least one of an iris or a face.

According to an embodiment, the processor is configured to recognize the specified object in the at least a portion of the obtained image and the other except for the at least a portion of the obtained image, while displaying the other image on the display.

According to an embodiment, the processor is configured to display a guide associated with the specified area on the display.

According to an embodiment, the processor is configured to display the other image on at least the specified area.

According to an embodiment, the processor is configured to determine an authentication area for obtaining the specified object based at least in part on the specified image.

According to an embodiment, the processor is configured to set a first area corresponding to the specified area to the authentication area when displaying the at least a portion of the obtained image and set a second area wider than the first area to the authentication area when displaying the other image.

According to an embodiment, the second area may correspond to the entire area of the obtained image. The other image may include an image displayed on the display before obtaining the image.

According to an embodiment, a method performed by an electronic device may include obtaining a request associated with biometric authentication, obtaining an image including at least one external object using a camera, in response to the request, displaying a specified image on the display, when displaying at least a portion of the obtained image on a specified area of the display, the at least a portion of the obtained image being as a portion of the specified image, in response to displaying a specified object associated with the biometric authentication among the at least one external object on the specified area, performing the biometric authentication using biometric information corresponding to the specific object, and when displaying another image different from the obtained image on the display, the other image being as a portion of the specified image, in response to obtaining an image including the specified object among the at least one external object, performing the biometric authentication using the biometric information corresponding to the specified object.

According to an embodiment, the method may further include displaying the at least a portion of the obtained image on the specified area and withholding the biometric authentication when the at least a portion of the image does not include the specified object.

According to an embodiment, the method may further include recognizing the specified object in the at least a portion of the obtained image, when displaying the at least a portion of the obtained image on a specified area of the display.

According to an embodiment, the method may further include displaying the at least a portion of the obtained image on the specified area and displaying a guide associated with the specified area on the display, when the at least a portion of the obtained image does not include the specified object.

According to an embodiment, an electronic device may include a camera, a display, and a processor. The processor is configured to receive a request associated with biometric authentication, obtain an image including at least one external object using the camera, based at least on the request, display a partial image corresponding to a specified location in the image on a specified area of the display, when a specified object associated with the biometric authentication among the at least one external object is displayed on the specified area of the display, perform authentication using biometric information corresponding to the specified object, and withhold performing the authentication, when the specified object is not displayed on the specified area of the display.

According to an embodiment, the processor is configured to, when the specified object is not displayed on the specified area of the display, display a guide associated with the specified area on the display.

According to an embodiment, the specified object may include at least one of an iris or a face.

According to an embodiment the processor may be configured to search for the specified object in a partial image displayed on the specified area.

According to an embodiment, the processor may be configured to obtain a next image using the camera in response to providing the guide.

Figure 9:
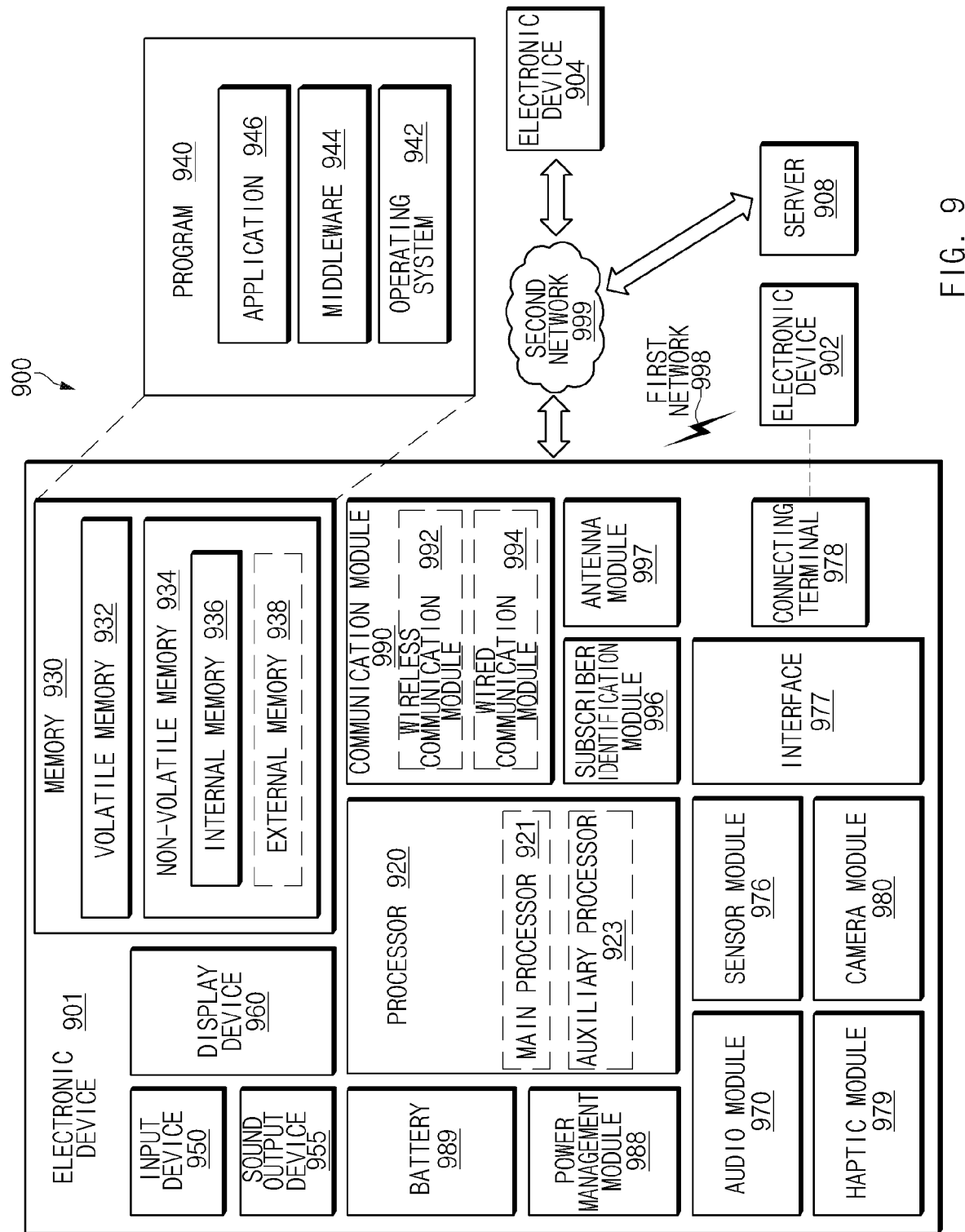
FIG. 9 is a block diagram illustrating an electronic device in a network environment according to various embodiments.

FIG. 9 is a block diagram illustrating an electronic device 901 in a network environment 900 according to various embodiments.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
   a camera;
   a display; and
   a processor,
   wherein the processor is configured to:
      obtain a request associated with biometric authentication;
      obtain an image including at least one external object using the camera, in response to the request, wherein the image comprises a specified area and a non-specified area;
      identify a state of the electronic device;
      when the state of the electronic device corresponds to a first state:
         display a preview image comprising the specified area of the display in conjunction with the biometric authentication; and
         in response to identifying that the specified area of the image includes a specified biometric object associated with the biometric authentication among the at least one external object, perform the biometric authentication using biometric information corresponding to the specific biometric object; and
      when the state of the electronic device corresponds to a second state:
         display a non-preview image on the display; and
         in response to identifying that the image includes the specified biometric object among the at least one external object, perform the biometric authentication using the biometric information corresponding to the specified biometric object,
      wherein the first state is a state where the biometric authentication is used to perform payment, and
      wherein the second state is a state where the biometric authentication is used to unlock the electronic device.

2. The electronic device of claim 1, wherein the processor is configured to:
   display the at least a portion of the obtained image on the specified area; and
   withhold the biometric authentication when the at least a portion of the image does not include the specified biometric object.

3. The electronic device of claim 1, wherein the processor is configured to:
   recognize the specified biometric object in the at least a portion of the obtained image.

4. The electronic device of claim 1, wherein the specified biometric object includes at least one of an iris or a face.

5. The electronic device of claim 1, wherein the processor is configured to:
   recognize the specified biometric object in the at least a portion of the obtained image and an area other than the at least a portion of the obtained image, while displaying the non-preview image on the display.

6. The electronic device of claim 2, wherein the processor is configured to:
   display a guide associated with the specified area on the display.

7. The electronic device of claim 1, wherein the processor is configured to:
   determine an authentication area for obtaining the specified biometric object based at least on the image displayed on the specified area.

8. The electronic device of claim 7, wherein the processor is configured to:
   set a first area corresponding to the specified area to the authentication area, when displaying the at least a portion of the obtained image; and
   set a second area wider than the first area to the authentication area, when displaying the non-preview image.

9. The electronic device of claim 8, wherein the second area corresponds to an entire area of the obtained image.

10. The electronic device of claim 7, wherein the non-preview image includes an image displayed on the display before obtaining the image.

11. A method, comprising:
   obtaining a request associated with biometric authentication;
   obtaining an image including at least one external object using a camera, in response to the request, wherein the image comprises a specified area and a non-specified area;
   identifying a state of an electronic device;
   when the state of the electronic device corresponds to a first state:
      displaying a preview image comprising the specified area of a display in conjunction with the biometric authentication; and
      in response to identifying that the specified area of the image includes a specified biometric object associated with the biometric authentication among the at least one external object, performing the biometric authentication using biometric information corresponding to the specified biometric object; and when the state of the electronic device corresponds to a second state:
  displaying a non-preview image on the display; and
  in response to identifying that the image includes the specified biometric object among the at least one external object, performing the biometric authentication using the biometric information corresponding to the specified biometric object,
wherein the first state is a state where the biometric authentication is used to perform payment, and
wherein the second state is a state where the biometric authentication is used to unlock the electronic device.

12. The method of claim 11, further comprising:
displaying the at least a portion of the obtained image on the specified area; and
withholding the biometric authentication, when the at least a portion of the image does not include the specified biometric object.

13. The method of claim 12, further comprising:
displaying the at least a portion of the obtained image on the specified area; and
displaying a guide associated with the specified area on the display, when the at least a portion of the obtained image does not include the specified biometric object.

14. The method of claim 11, further comprising:
recognizing the specified biometric object in the at least a portion of the obtained image, when displaying the at least a portion of the obtained image on the specified area of the display.

15. The method of claim 11, further comprising:
determining an authentication area for obtaining the specified biometric object based at least on the image displayed on the specified area.

* * * * *